US009843752B2

(12) United States Patent
Yamamoto et al.

(10) Patent No.: US 9,843,752 B2
(45) Date of Patent: Dec. 12, 2017

(54) SOLID-STATE IMAGE SENSOR, DRIVING METHOD THEREOF, AND CAMERA

(71) Applicant: CANON KABUSHIKI KAISHA, Tokyo (JP)

(72) Inventors: Takuro Yamamoto, Yokohama (JP); Tatsuhiko Yamazaki, Zama (JP); Shintaro Takenaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 14/874,868

(22) Filed: Oct. 5, 2015

(65) Prior Publication Data

US 2016/0112661 A1    Apr. 21, 2016

(30) Foreign Application Priority Data

Oct. 15, 2014   (JP) ................................ 2014-211088

(51) Int. Cl.
  *H04N 5/369* (2011.01)
  *H04N 5/376* (2011.01)
  *H04N 5/378* (2011.01)

(52) U.S. Cl.
  CPC ........... *H04N 5/3698* (2013.01); *H04N 5/378* (2013.01); *H04N 5/3765* (2013.01)

(58) Field of Classification Search
  CPC ..... H04N 5/3698; H04N 5/378; H04N 5/3765
  See application file for complete search history.

(56) References Cited

U.S. PATENT DOCUMENTS

| | | | |
|---|---|---|---|
| 7,999,866 B2 | 8/2011 | Sonoda et al. | |
| 8,049,799 B2 | 11/2011 | Sonoda et al. | |
| 8,081,246 B2 | 12/2011 | Takenaka | |
| 8,305,473 B2 | 11/2012 | Takenaka et al. | |
| 8,363,137 B2 | 1/2013 | Sonoda et al. | |
| 8,466,994 B2 | 6/2013 | Takenaka | |
| 8,670,058 B2 | 3/2014 | Hayashi et al. | |
| 8,754,978 B2 | 6/2014 | Hayashi et al. | |
| 2011/0267513 A1 | 11/2011 | Sonoda et al. | |
| 2012/0013778 A1 | 1/2012 | Sonoda et al. | |
| 2013/0235239 A1* | 9/2013 | Wu | H04N 5/3765 348/302 |
| 2014/0022407 A1 | 1/2014 | Yamazaki | |
| 2014/0078358 A1 | 3/2014 | Takenaka et al. | |
| 2015/0129744 A1 | 5/2015 | Sonoda et al. | |

FOREIGN PATENT DOCUMENTS

JP        2006-081048 A        3/2006

\* cited by examiner

*Primary Examiner* — Ahmed A Berhan
(74) *Attorney, Agent, or Firm* — Fitzpatrick, Cella, Harper & Scinto

(57) ABSTRACT

A solid-state image sensor, comprising a plurality of circuit groups each of which can assume an operating state and a non-operating state, a storage unit configured to store an order of switching the plurality of circuit groups from the non-operating state to the operating state, and a control unit configured to receive, from outside the sensor, a control signal, common to the plurality of circuit groups, for switching the plurality of circuit groups from the non-operating state to the operating state, wherein after receiving the control signal, the control unit sequentially switches, according to the order stored in the storage unit, the plurality of circuit groups from the non-operating state to the operating state at an interval of a period corresponding to an integer multiple of a cycle of a clock signal.

11 Claims, 10 Drawing Sheets

SOLID-STATE IMAGE SENSOR, DRIVING METHOD THEREOF, AND CAMERA

BACKGROUND OF THE INVENTION

Field of the Invention

The present invention relates to a solid-state image sensor, a driving method thereof, and a camera.

Description of the Related Art

A solid-state image sensor includes, for example, a plurality of pixels arrayed in a matrix, a driving unit, a readout unit, a transferring unit, and an output unit. The driving unit is a vertical scanning circuit including, for example, a shift register and drives, based on a synchronizing signal, the plurality of pixels while scanning them for each row. The readout unit reads out pixel signals from the driven pixels. The transferring unit is a horizontal scanning circuit including, for example, a shift register and transfers, based on the synchronizing signal, the read out pixel signals while scanning them for each column.

If, for example, shooting is not started over a predetermined period of time, power consumption of the solid-state image sensor can be reduced by setting an operating mode of some units to a sleep state. This can be done by, for example, stopping power supply to a control target unit.

Japanese Patent Laid-Open No. 2006-081048 describes setting an order of changing the states of a plurality of units which constitute a solid-state image sensor in order to prevent an unexpected forward bias current from being caused by a PN junction in the solid-state image sensor. However, Japanese Patent Laid-Open No. 2006-081048 does not disclose a way of determining a timing to change the state of each unit.

SUMMARY OF THE INVENTION

The present invention provides a technique advantageous in determining a timing to change an operating mode of each unit which constitutes a solid-state image sensor.

One of the aspects of the present invention provides a solid-state image sensor, comprising a plurality of circuit groups each of which assume an operating state and a non-operating state, a storage unit configured to store an order of switching the plurality of circuit groups from the non-operating state to the operating state, and a control unit configured to receive, from outside the sensor, a control signal for switching the plurality of circuit groups from the non-operating state to the operating state, the control signal being a common signal to the plurality of circuit groups, wherein after receiving the control signal, the control unit sequentially switches, according to the order stored in the storage unit, the plurality of circuit groups from the non-operating state to the operating state at an interval of a period corresponding to an integer multiple of a cycle of a clock signal.

Further features of the present invention will become apparent from the following description of exemplary embodiments with reference to the attached drawings.

DESCRIPTION OF THE EMBODIMENTS

An example of the control system of each unit of a solid-state image sensor 100 (to be simply referred to as a "sensor 100" hereinafter) according to the present invention will be described with reference to FIG. 1A.

Figure 1A:
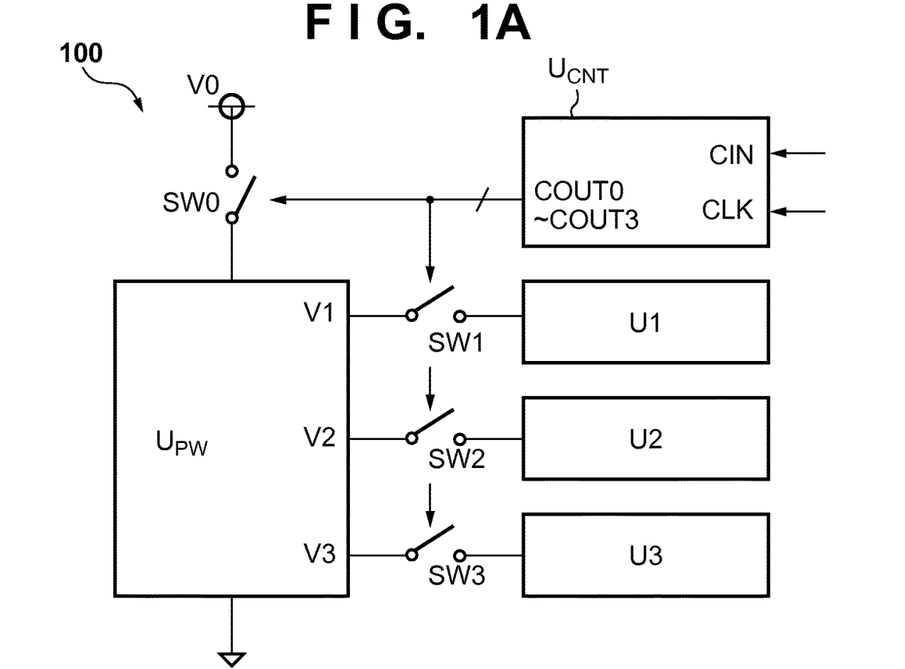
FIGS. 1A and 1B are a block diagram and a timing chart, respectively, for explaining an example of the control system of each unit of a solid-state image sensor.

As illustrated in FIG. 1A, the sensor 100 includes, for example, a power supply unit $U_{PW}$ which supplies power to units U1 to U3 and a control unit $U_{CNT}$. The power supply unit $U_{PW}$ is electrically connected to a power supply line V0 via a switch SW0. When the switch SW0 is turned on, the power supply unit $U_{PW}$ receives a predetermined voltage from the power supply line V0 and generates a constant voltage or a constant current to be supplied to each of the units U1 to U3. The units U1 to U3 are, for example, a readout unit configured to read out a pixel signal, an output unit configured to output the read out signal, and another circuit unit which constitutes the sensor 100.

The units U1 to U3 are electrically connected to the power supply unit $U_{pw}$ via switches SW1 to SW3, respectively. When the switches SW1 to SW3 are turned on, the units U1 to U3 receive corresponding power distributions (V1 to V3) from the power supply unit $U_{pw}$. A case in which the number of units is three has been exemplified for the sake of simplicity. However, the number of units may be one, two, or four or more.

The control unit $U_{CNT}$ controls the above-described switches SW0 to SW3. More specifically, the control unit $U_{CNT}$ outputs, based on a control signal received at a terminal CIN and a synchronizing signal received at a terminal CLK, control signals for controlling the switches SW0 to SW3 from terminals COUT0 to COUT3, respectively.

Figure 1B:
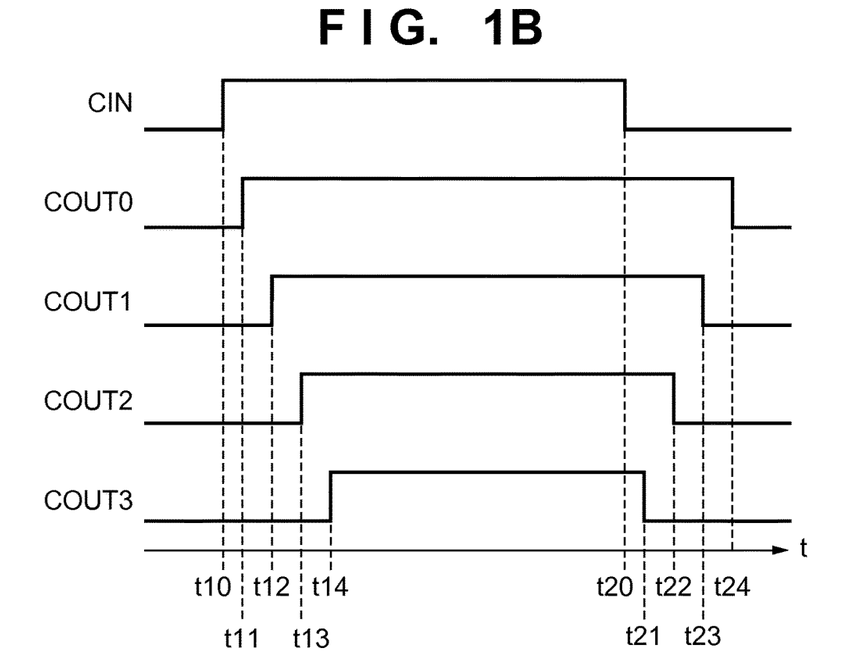

FIG. 1B is a timing chart of the control signals input to the control unit $U_{CNT}$ and the control signals output from the control unit $U_{CNT}$. Note that reference symbols for the control signals in FIG. 1B are assumed to be the same as those of the corresponding terminals. For example, the control signal input to the terminal CIN is referred to as the "control signal CIN".

At time t10, the control signal CIN changes to high level (H). In response to this, the control unit $U_{CNT}$ sets the control signals COUNT0 to COUNT3 at H in an order of COUNT0, COUNT1, COUNT2, and COUNT3. As a result, the switches SW0 to SW3 are turned on in an order of SW0, SW1, SW2, and SW3. More specifically, at time t11, the control signal COUNT0 is set at H to turn on the switch SW0 and the power supply unit $U_{PW}$ is electrically connected to the power supply line V0. Then, at times t12 to t14, the control signals COUNT1 to COUNT3 are sequentially set at H to sequentially turn on the switches SW1 to SW3 and power supply from the power supply unit $U_{PW}$ to the units U1 to U3 is started sequentially. Timings to output the control signals COUNT0 to COUNT3 are determined based on the synchronizing signal CLK.

At time t20, the control signal CIN changes to low level (L). In response to this, the control unit $U_{CNT}$ sets the control signals COUNT0 to COUNT3 at L in an order of COUNT3, COUNT2, COUNT1, and COUNT0. That is, the signal levels of the control signals COUNT0 to COUNT 3 are changed in a reverse order to the order of times t11 to t14. As a result, the switches SW0 to SW3 are turned off in an order of SW3, SW2, SW1, and SW0. More specifically, at times t21 to t23, the control signals COUNT3 to COUNT 1 are sequentially set at L to turn off the switches SW3 to SW1 and power supply from the power supply unit $U_{PW}$ to the units U1 to U3 is stopped. Then, at time t24, the control signal COUNT0 is set at L to turn off the switch SW0 and the power supply unit $U_{PW}$ is electrically disconnected from the power supply line V0.

The timings to output the control signals COUNT0 to COUNT3 are determined based on the synchronizing signal CLK. This method is advantageous in changing the operating mode of each unit which constitutes the sensor 100 and determining its timing.

Note that in a series of operations described above, an operating state in which power is supplied from the power supply unit $U_{pw}$ to the units U1 to U3 may be referred to as, for example, an "active mode". A non-operating state in which the supply of power is suppressed may be referred to as, for example, a "power saving mode". A series of operations at times t10 to t14 described above may be referred to as return operations from the power saving mode.

One of the units U1 to U3 supplies the pixel signal, pixel data, or signal or data corresponding to it to at least one of the other two. Therefore, power supply to the units U1 to U3 and its stop are preferably performed in a predetermined order, as has been described with reference to FIG. 1B. For example, if the unit U1 receives a signal from the unit U2 and performs predetermined signal processing, the unit U1 needs to be in a state capable of receiving the signal before receiving the signal from the unit U2 when returning from the power saving mode to the active mode. Therefore, power supply to the unit U1 is performed before power supply to the unit U2. Similarly, when shifting from the active mode to the power saving mode, for example, the stop of power supply to the unit U1 is performed after the stop of power supply to the unit U2, thereby inhibiting an unnecessary signal or the like from being supplied from the unit U2 to the unit U1.

Practical examples of the present invention will be described below with reference to several embodiments.

(First Embodiment)

Figure 2:
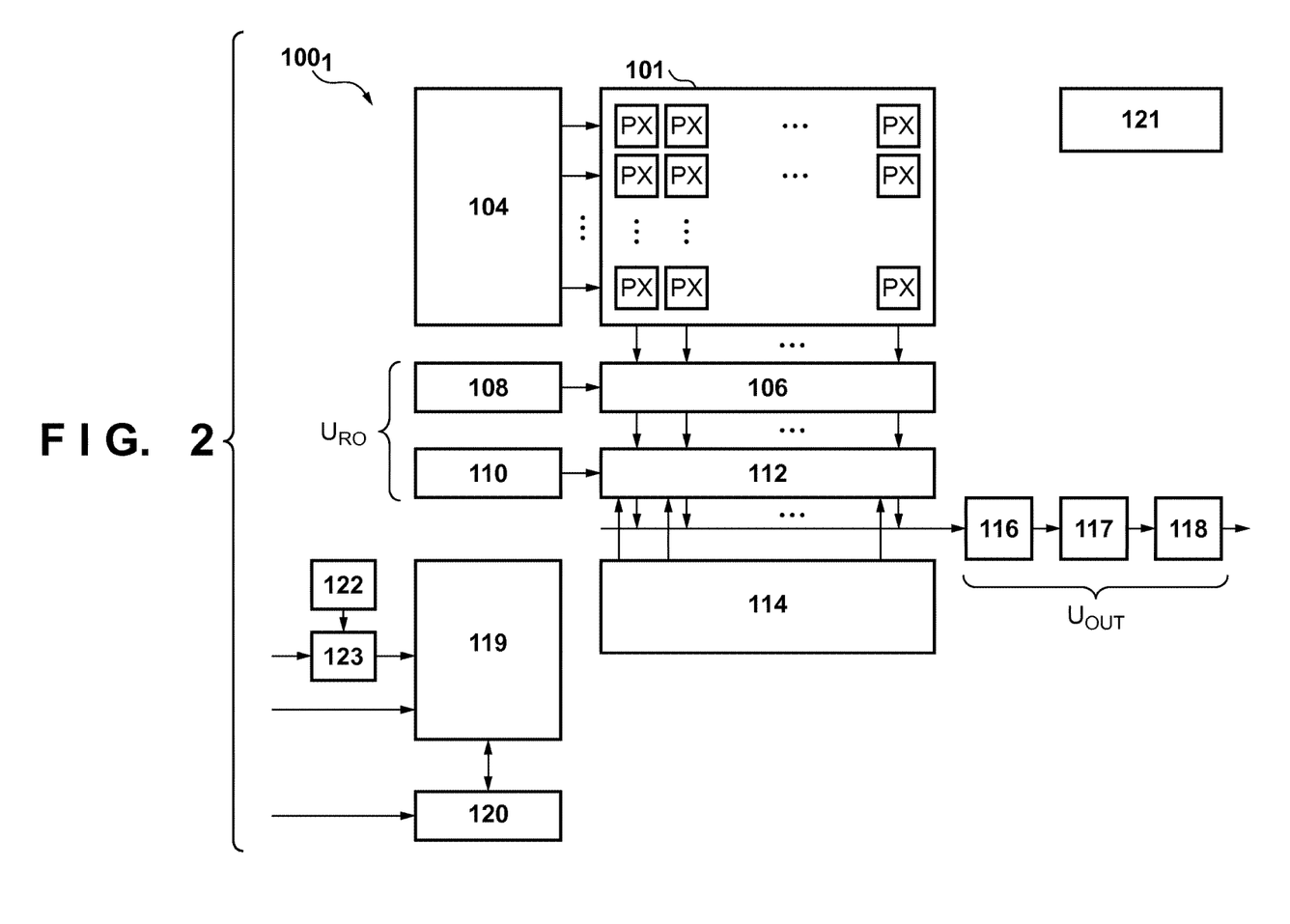
FIG. 2 is a block diagram for explaining an example of the overall arrangement of the solid-state image sensor.

A solid-state image sensor $100_1$ according to the first embodiment will be described with reference to FIGS. 2 to 6. As illustrated in FIG. 2, the sensor $100_1$ includes an image sensing unit 101, a driving unit 104, a readout unit $U_{RO}$, a transferring unit 114, and an output unit $U_{OUT}$. The image sensing unit 101 includes a pixel array in which a plurality of pixels PX are arrayed so as to form a plurality of rows and a plurality of columns.

Figure 3:
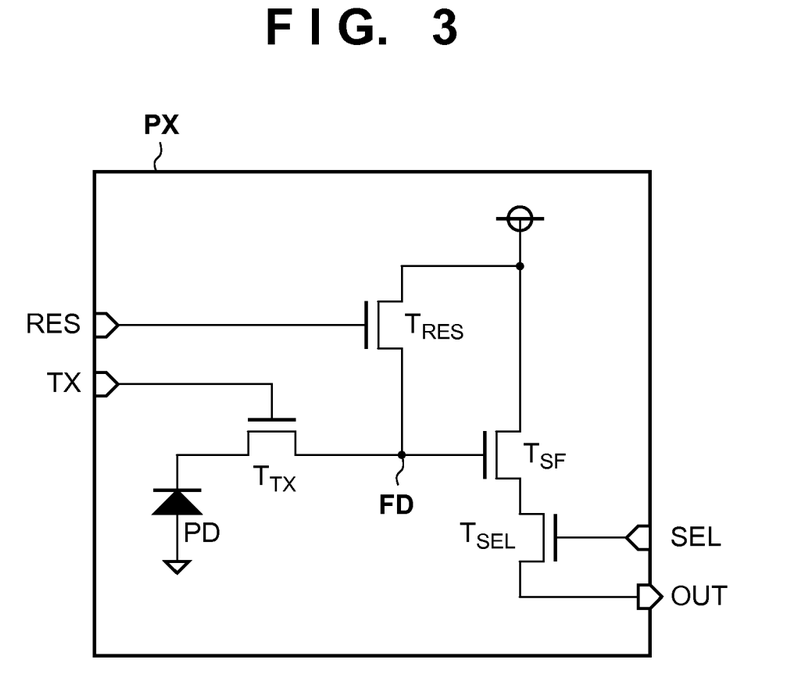
FIG. 3 is a block diagram for explaining an arrangement example of a unit pixel.

As illustrated in FIG. 3, each pixel PX includes a photoelectric conversion element PD (for example, a photodiode), a transfer transistor $T_{TX}$, a floating diffusion FD, a reset transistor $T_{RES}$, a source follower transistor $T_{SF}$, and a selection transistor $T_{SEL}$. A control signal TX is supplied to the gate terminal of the transfer transistor $T_{TX}$. When the control signal TX is activated, charges which are generated upon receiving light and accumulated in the photoelectric conversion element PD are transferred to the floating diffusion FD by the transfer transistor $T_{TX}$. The source potential of the source follower transistor $T_{SF}$ changes depending on a variation in the amount of the charges transferred to the floating diffusion FD. A control signal SEL is supplied to the gate terminal of the selection transistor $T_{SEL}$. When the control signal SEL is activated, the selection transistor $T_{SEL}$ outputs a pixel signal corresponding to the source potential of the source follower transistor $T_{SF}$ from an output terminal OUT to a column signal line. A control signal RES is supplied to the gate terminal of the reset transistor $T_{RES}$. When the control signal RES is activated, the reset transistor $T_{RES}$ resets the potential of the floating diffusion FD.

Based on a synchronizing signal from a timing generator 119, the driving unit 104 drives the plurality of pixels PX while scanning them for each row. More specifically, the driving unit 104 is a vertical scanning circuit including, for example, a shift register and drives, based on the synchronizing signal (assumed to be a vertical synchronizing signal) and a clock signal, the plurality of pixels PX while selecting the row.

The readout unit $U_{RO}$ includes, for example, a comparator 106, a ramp generator 108, a counter 110, and a memory 112. The comparator 106 is arranged so as to correspond to each column of the pixel array and, upon receiving, from the ramp generator 108, a ramp signal having a signal level which changes with the lapse of time, compares the magnitude relationship between the ramp signal and signals from the pixels PX (pixel signals) on the corresponding column. The counter 110 measures a time elapsed after the above-described comparison by the comparator 106 is started. Then, the measurement result (count value) of the counter 110 is held in the memory 112 in accordance with a comparison result by the comparator 106 (more specifically, in response to the reversal of the magnitude relationship between the ramp signal and the pixel signals). Analog-to-digital conversion (A/D conversion) of the pixel signals can be performed in this way.

Based on the synchronizing signal from the timing generator 119, the transferring unit 114 transfers the value held in the memory 112 to the output unit $U_{OUT}$ while scanning it for each column. More specifically, the transferring unit 114 is a horizontal scanning circuit including, for example, a shift register and horizontally transfers, based on the synchronizing signal (assumed to be a horizontal synchronizing signal) and the clock signal, the value held in the memory 112 while selecting the column.

The output unit $U_{OUT}$ includes, for example, a signal processing circuit 116, a parallel-serial conversion circuit 117, and an LVDS (low voltage differential signal) circuit 118. The signal processing circuit 116 performs predetermined signal processing (for example, subtraction processing using the pixel signals when resetting the pixels PX) on the pixel signals horizontally transferred by the transferring unit 114. The parallel-serial conversion circuit 117 performs parallel-serial conversion on a signal from the signal processing circuit 116. The LVDS circuit 118 externally outputs the converted data in an LVDS transmission method.

The sensor $100_1$ further includes the timing generator 119, a PLL circuit 120, a bandgap circuit 121 (bandgap reference), an information holding unit 122, and a control setting unit 123.

The timing generator 119 generates one or more synchronizing signals for controlling each unit which constitutes a sensor 100 and supplies the synchronizing signal to the corresponding unit. For example, the driving unit 104 performs scanning for each row upon receiving a vertical synchronizing signal VD from the timing generator 119 and drives the plurality of pixels PX. Further, for example, the transferring unit 114 performs scanning for each column upon receiving a horizontal synchronizing signal HD from the timing generator 119 and transfers the pixel signals. Likewise, each of the other units performs a predetermined operation upon receiving a corresponding signal from the timing generator 119. Note that some synchronizing signals including the vertical synchronizing signal VD and the horizontal synchronizing signal HD may directly be supplied from outside.

The PLL circuit 120 is a signal generating unit which generates one or more clock signals based on an external reference clock signal (more specifically, by dividing or multiplying the reference clock signal) and supplies the generated clock signal to the corresponding unit. The PLL circuit 120 can also generate two or more clock signals having different frequencies. The two or more clock signals are supplied to, for example, the counter 110, the signal processing circuit 116, the LVDS circuit 118, or the timing generator 119.

Upon receiving a predetermined voltage from the power supply line, the bandgap circuit 121 generates one or more voltages to be supplied to each unit which constitutes the sensor 100 and supplies the voltage to the corresponding unit. The bandgap circuit 121 can also generate two or more voltages having different values. The two or more voltages are supplied to, for example, the image sensing unit 101, the driving unit 104, the comparator 106, the ramp generator 108, the counter 110, the memory 112, the transferring unit 114, the LVDS circuit 118, or the PLL circuit 120.

The information holding unit 122 holds predetermined information, or information based on shooting conditions (for example, a shutter speed and an exposure time) set by a user before shooting or changed by the user during shooting, and serves as a storage unit such as a nonvolatile memory. The information can include, for example, information for specifying a control order of the units, their timings, or the like when changing the operating mode (active mode/power saving mode). For example, the control setting unit 123 reads out the information from the information holding unit 122 upon receiving the operating mode change notification and sets a control parameter based on the information in the timing generator 119. The timing generator 119 generates, in addition to the synchronizing signals, a control signal to be supplied to a power supply control target unit and corresponding to the set parameter. The control signal is generated based on, for example, at least one of the vertical synchronizing signal VD supplied to the driving unit 104 and the horizontal synchronizing signal HD supplied to the transferring unit 114.

Figure 4:
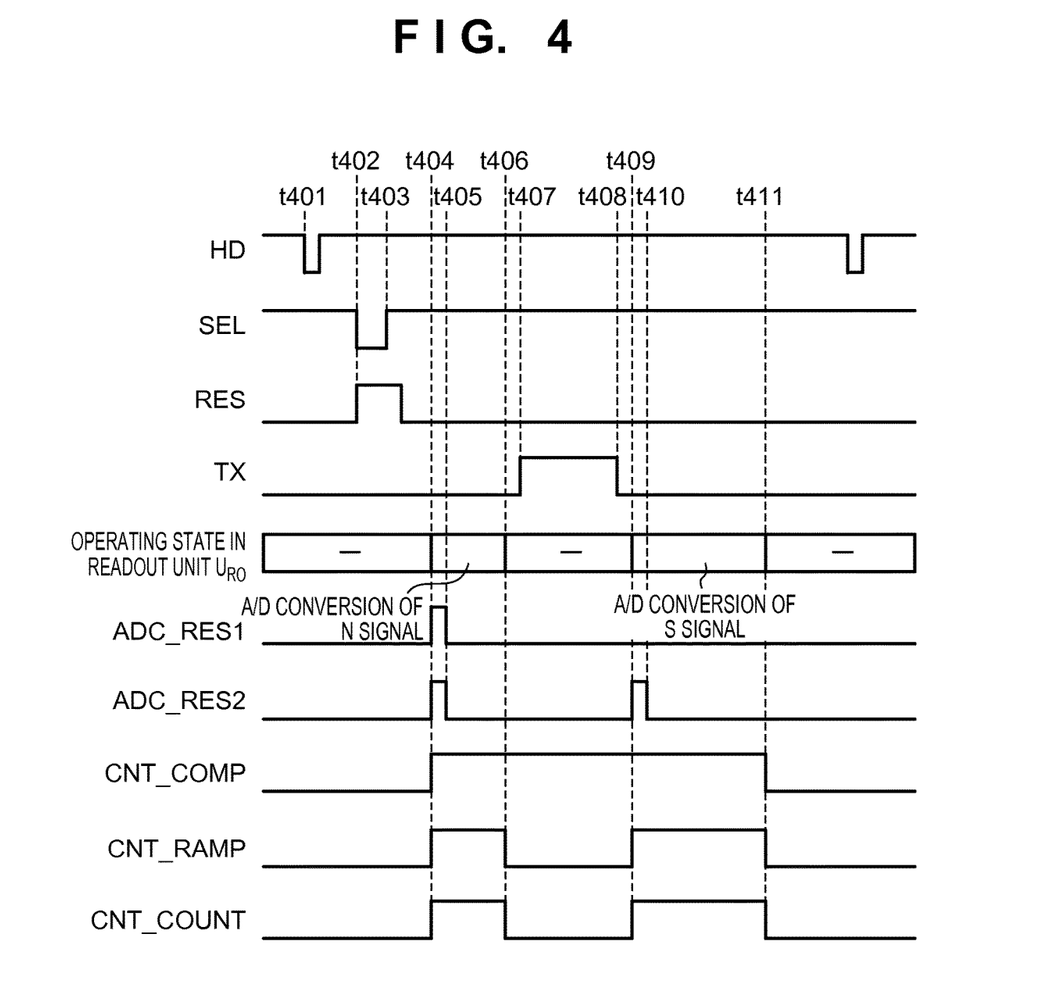
FIG. 4 is a timing chart for explaining an example of the readout operation of the solid-state image sensor.

FIG. 4 exemplifies a timing chart when performing the readout operation of the pixel signals. In FIG. 4, the abscissa represents a time axis and the ordinate represents, in addition to the aforementioned respective signals HD, SEL, RES, and TX, an operating state in the readout unit $U_{RO}$ and the control signal of each unit which constitutes the readout unit $U_{RO}$. A control signal ADC_RES1 is a control signal for resetting the comparator 106. A control signal ADC_RES2 is a control signal for resetting the ramp generator 108 and the counter 110. Control signals CNT_COMP, CNT_RAMP, and CNT_COUNT are, respectively, control signals for controlling power supply to the comparator 106, the ramp generator 108, and the counter 110. In this timing chart, all the above-described control signals are activated at H and inactivated at L.

After the signal HD changes to H at time t401, the floating diffusion FD is reset by setting the signal SEL at L and setting the signal RES at H at time t402. Then, the signal SEL is set at H at time t403, thereby selecting the pixel PX of a pixel signal readout target.

Then, at time t404, the signals ADC_RES1 and ADC_RES2 are set at H, thereby resetting the comparator 106, the ramp generator 108, and the counter 110. After that, at time t405, the signals ADC_RES1 and ADC_RES2 are set at L, thereby performing A/D conversion on a signal (assumed to be an "N signal") corresponding to the potential of the floating diffusion FD reset at time t402. Assuming that the A/D conversion is completed at time t406, the signals CNT_COMP, CNT_RAMP, and CNT_COUNT are maintained at H during times t404 to t406.

After the signals CNT_RAMP and CNT_COUNT are set at L at time t406, the signal TX is set at H at time t407, thereby transferring the charges generated and accumulated in the photoelectric conversion element PD to the floating diffusion FD. Then, the signal TX is set at L at time t408.

At times t409 to t411, the same operations as those at times t404 to t406 are performed. By doing so, A/D conversion is performed on a signal (assumed to be an "S signal") corresponding to the potential of the floating diffusion FD to which the charges have been transferred at time t407. Then, the aforementioned signal processing circuit 116 obtains, as a signal component, the difference between the N signal and the S signal.

Referring back to FIG. 2, the timing generator 119, the information holding unit 122, and the control setting unit 123 correspond to the control unit $U_{CNT}$ described with reference to FIG. 1A. The operating mode change notification corresponds to the control signal CIN described with reference to FIG. 1B. The bandgap circuit 121 corresponds to the power supply unit $U_{PW}$. Further, the control signal to be supplied to the power supply control target unit corresponds to the control signal COUNT0 or the like described with reference to FIG. 1A. That is, in this example, in response to the operating mode change notification, power supply to the control target unit is stopped or the power supply is resumed at a timing determined based on at least one of the vertical synchronizing signal VD and the horizontal synchronizing signal HD. This will be described in detail below with reference to FIG. 5.

Figure 5:
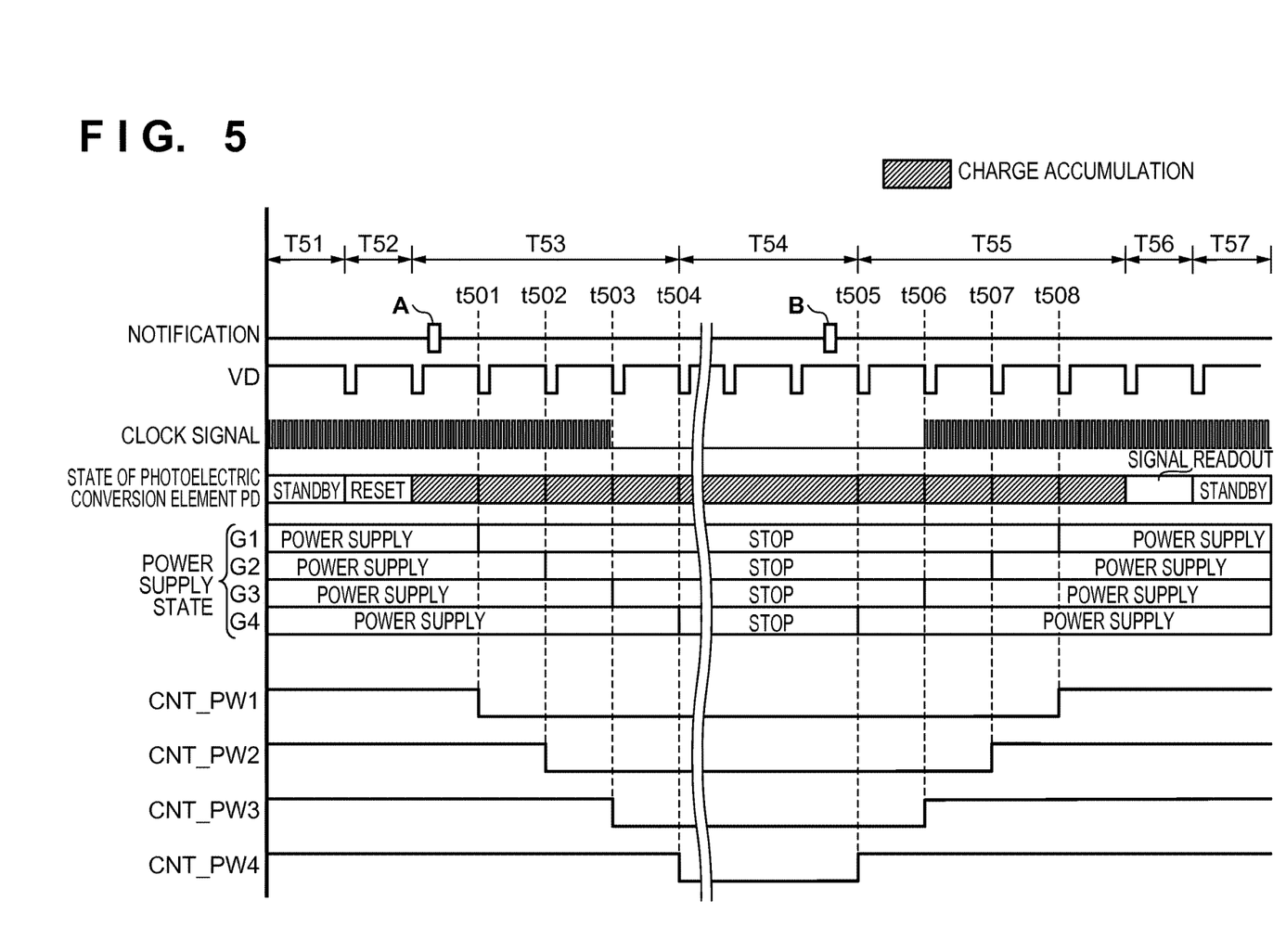
FIG. 5 is a timing chart showing an example when changing an operating mode.

FIG. 5 exemplifies a timing chart when the operating mode shifts from the active mode to the power saving mode, and then returns to the active mode again while performing charge accumulation in the photoelectric conversion element PD. In FIG. 5, the abscissa represents a time axis and the ordinate represents the operating mode change notification, the vertical synchronizing signal VD, a clock signal (for example, a clock signal supplied to the driving unit 104), and the state of the photoelectric conversion element PD. In addition to them, the power supply state of each of four groups G, that is, G1 to G4 obtained when the respective units which constitute the sensor $100_1$ are divided into the four groups G and control signals CNT_PW1 to CNT_PW4 corresponding to the states are shown below.

The group G1 includes, for example, units each of which performs a predetermined operation upon receiving power such as a constant voltage or a constant current and a reference signal such as the clock signal. In this example, the group G1 can include, for example, the image sensing unit 101, the comparator 106, the ramp generator 108, the counter 110, and the signal processing circuit 116.

The group G2 includes, for example, a unit which performs a predetermined operation upon receiving the above-described power and the above-described reference signal, and receiving signals from at least some of the units in the group G1. In this example, the group G2 can include, for example, the LVDS circuit 118.

The group G3 includes, for example, a unit which supplies the above-described reference signals to at least some of the units in the groups G1 and G2 upon receiving the above-described power. In this example, the group G3 can include, for example, the PLL circuit 120.

The group G4 includes, for example, a unit which supplies the above-described power to the groups G1 to G3. In this example, the group G4 can include, for example, the bandgap circuit 121. The information holding unit 122 functions as the storage unit and stores, in advance, a transition order from the power saving mode to the active mode and a transition order from the active mode to the power saving mode of each of the groups G1 to G4. In this example, the circuits of the groups G1 to G4 sequentially transit from the active mode to the power saving mode in ascending order from the groups G1 to G4. Then, the circuits of the groups G1 to G4 sequentially transit from the power saving mode to the active mode in descending order from the groups G4 to G1.

In this example, after the standby state of a period T51, all the pixels PX are reset upon receiving the vertical synchronizing signal VD in a period T52. Then, while the photoelectric conversion element PD of each pixel PX changes to a charge accumulation state, the operating mode shifts from the active mode to the power saving mode here in response to an operating mode change notification A. More specifically, in response to the first vertical synchronizing signal VD after receiving the notification A (here, at a timing when the signal VD changes from H to L), the signal CNT_PW1 is changed from H to L and power supply to the group G1 is stopped. Time at this time will be referred to as time t501.

Then, in response to the second vertical synchronizing signal VD after receiving the notification A, the signal CNT_PW2 is changed from H to L and power supply to the group G2 is stopped (time t502). Similarly, power supply to the group G3 is stopped in response to the third vertical synchronizing signal VD (time t503), and power supply to the group G4 is further stopped in response to the fourth vertical synchronizing signal VD (time t504).

After a predetermined period has elapsed, the operating mode returns from the power saving mode to the active mode in response to an operating mode change notification B. More specifically, in response to the first vertical synchronizing signal VD after receiving the notification B, the signal CNT_PW4 is changed from L to H and power supply to the group G4 is resumed (time t505). Then, in response to the second vertical synchronizing signal VD after receiving the notification B, the signal CNT_PW3 is changed from L to H and power supply to the group G3 is resumed (time t506). Similarly, power supply to the group G2 is resumed in response to the third vertical synchronizing signal VD (time t507), and power supply to the group G1 is further resumed in response to the fourth vertical synchronizing signal VD (time t508).

It can also be said that a period T53 is a period for the operating mode to shift from the active mode to the power saving mode. It can also be said that a period T55 is a period for the operating mode to return from the power saving mode to the active mode. During the period T53, a period 54, and the period T55, the photoelectric conversion element PD of each pixel PX is maintained in the charge accumulation state.

Also, referring to FIG. 5, since the PLL circuit 120 of the group G3 does not generate the clock signal during times t503 to t506, the waveform of the clock signal is maintained at L in FIG. 5. When returning from the power saving mode to the active mode afterward, a period of times t506 to t507 can be set in consideration of a time until the clock signal resumed being generated become stable (a so-called lock-up time). Note that the PLL circuit 120 may be configured such that power other than the above-described power is supplied irrespective of the operating mode. In this case, the operating mode can also be controlled by, for example, stopping or resuming supplying the external reference clock signal to the PLL circuit 120.

After that, the readout operation of the pixel signal from each pixel PX is performed in a period T56. Then, the standby state (the same state as in the period T51) is set again in a period T57.

According to this example, when shifting from the active mode to the power saving mode, power supply to the groups G1 to G4 is stopped in an order of the groups G1, G2, G3, and G4 upon receiving the above-described notification A. When returning from the power saving mode to the active mode, power supply to the groups G1 to G4 is resumed in an order of the groups G4, G3, G2, and G1 upon receiving the above-described notification B. A timing at which their power supply is stopped or resumed is determined based on the vertical synchronizing signal VD.

The above-described notifications A and B may be externally supplied from the sensor $100_1$ or may be supplied from a mode control unit which is configured to control the operating mode and further included in the sensor $100_1$. In this example, a mode in which power supply to the groups G1 to G4 is sequentially stopped or resumed every pulse of the vertical synchronizing signal VD has been exemplified. However, the number of pulses is not limited to the number in this example. The power supply may be configured to be sequentially stopped or resumed, for example, every two or more pulses. The number of pulses may be changed based on the shooting conditions set by the user. That is, power supply to the groups G1 to G4 suffices to be stopped or resumed sequentially in a cycle corresponding to an integer multiple of the clock signal.

The signals CNT_PW1 to CNT_PW4 are generated by the timing generator 119 and can be generated by using, for example, a plurality of latch circuits. For example, when shifting from the active mode to the power saving mode, a signal according to the notification A is output as the signal CNT_PW1 while latching it by the latch circuits based on, for example, the vertical synchronizing signal VD. Then, the latched signal is output as the signal CNT_PW2 based on the next vertical synchronizing signal VD. The same also applies to the signals CNT_PW3 to CNT_PW4. The same consideration can be given when returning from the power saving mode to the active mode (in the case of the notification B).

A mode where the timing at which power supply to the groups G1 to G4 is stopped or resumed is determined based on the vertical synchronizing signal VD has additionally been exemplified in the above-described example. As exemplified in FIG. 6, however, the timing may be determined based on the horizontal synchronizing signal HD.

Figure 6:
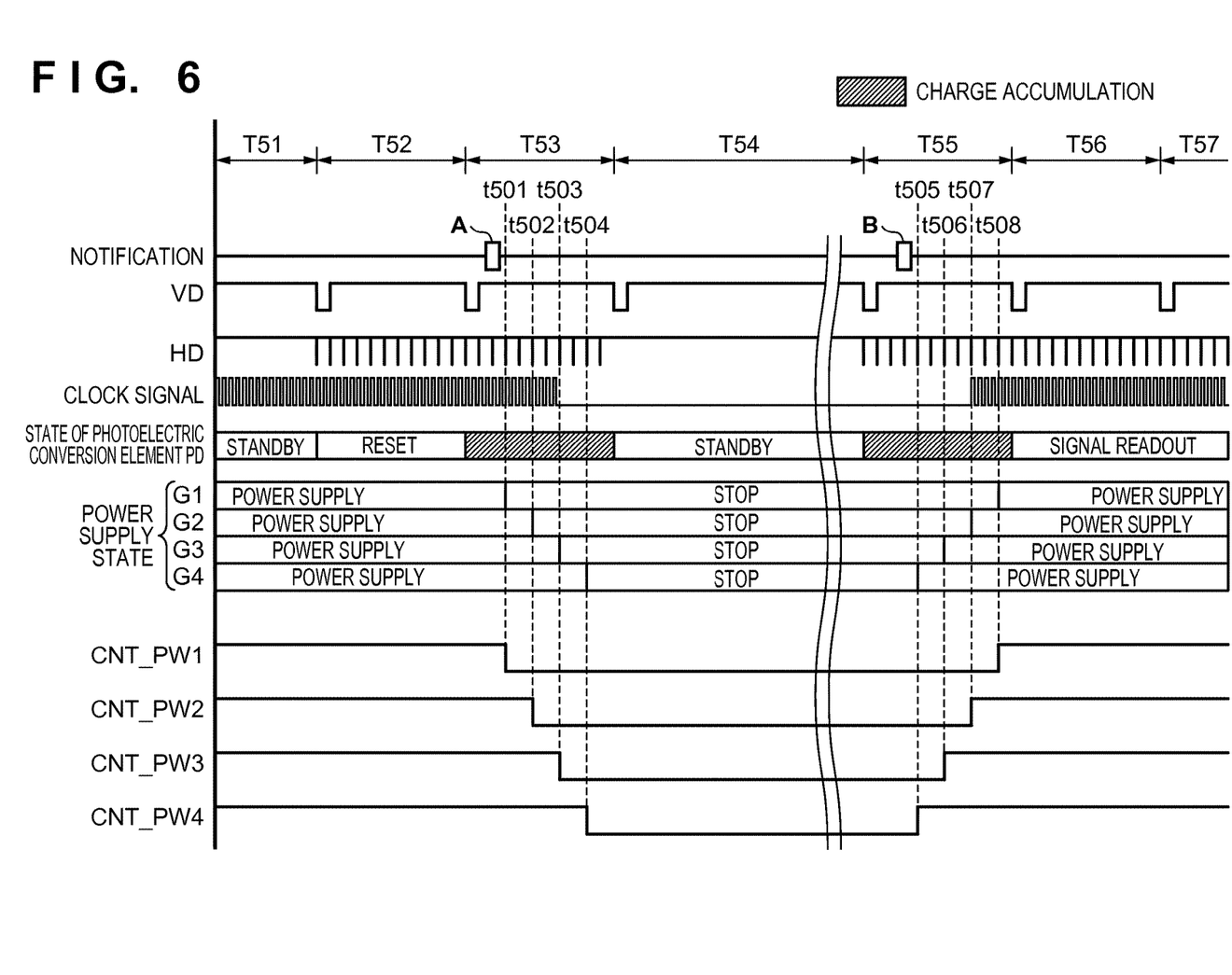
FIG. 6 is a timing chart showing an example when changing the operating mode.

FIG. 6 shows a timing chart in another example as in FIG. 5. For example, while receiving the vertical synchronizing signal VD for one pulse (while selecting one row), assuming that N is an integer equal to 2 or more, the horizontal synchronizing signals HD for N pulses are received (N columns are selected sequentially). Then, in this example, power supply to the groups G1 to G4 is sequentially stopped or resumed every two pulses of the horizontal synchronizing signals HD. Note that the number of pulses is not limited to the number in this example. The power supply may be configured to be sequentially stopped or resumed every pulse or every three or more pulses. That is, power supply to the groups G1 to G4 suffices to be stopped or resumed sequentially in the cycle corresponding to the integer multiple of the clock signal.

In this embodiment, a mode in which power supply is stopped when setting the groups G1 to G4 to the non-operating state and power supply is performed when setting the groups G1 to G4 to the operating state has been exemplified. However, this may be done by another mode. For example, the amount of power to be supplied may be reduced when setting the groups G1 to G4 to the non-operating state as compared with a case in which the groups G1 to G4 are set to the operating state. According to this example, since the relatively small amount of power is supplied in the non-operating state, the speed of the transition from the non-operating state to the operating state can be increased as compared with a case in which power supply is stopped.

(Second Embodiment)

The groups G1 to G4 exemplified in the aforementioned first embodiment are merely an example. The number of groups and the units included in each group can be changed appropriately in accordance with the arrangement of the sensor 100.

Figure 7:
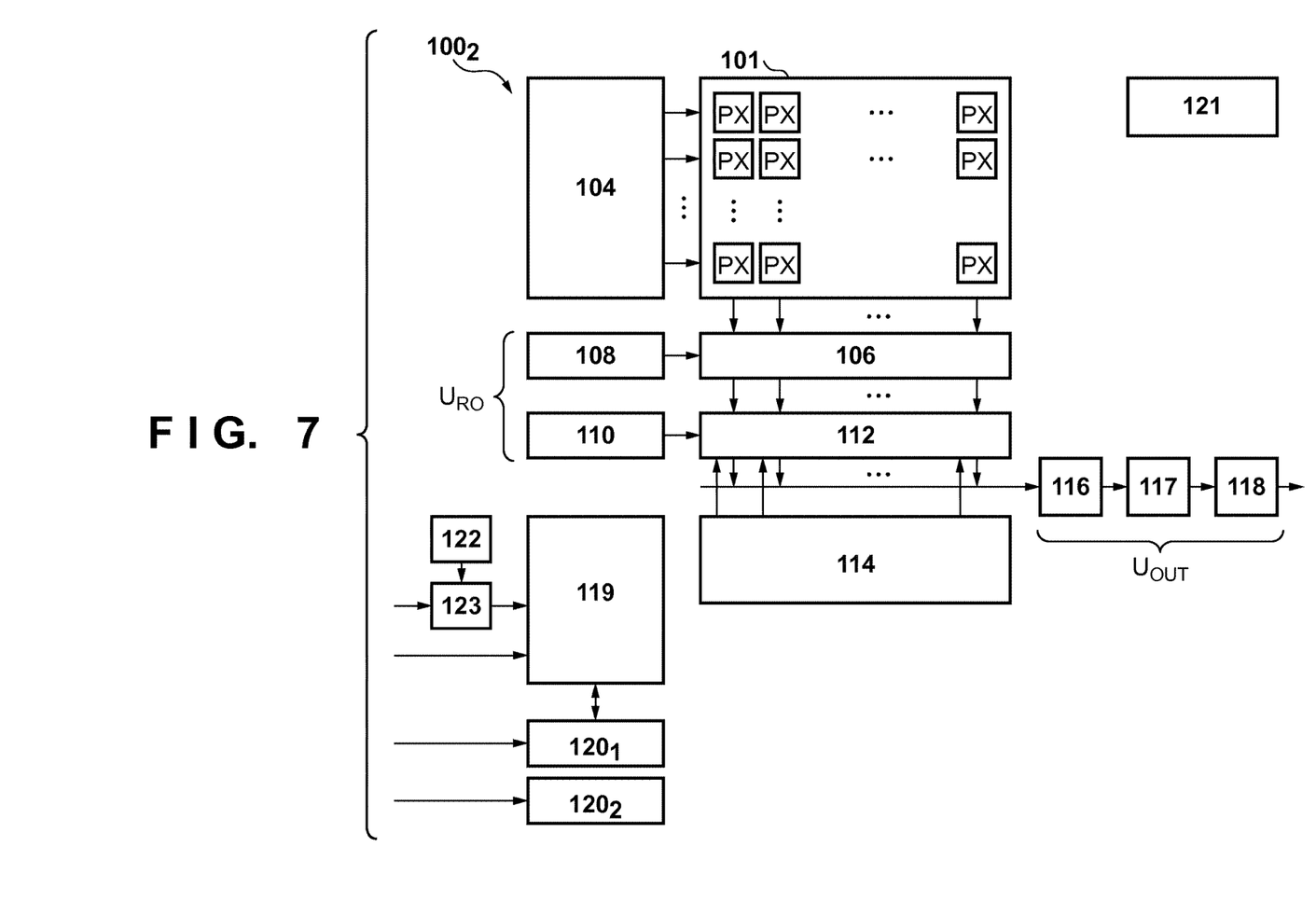
FIG. 7 is a block diagram for explaining an example of the overall arrangement of a solid-state image sensor.

A solid-state image sensor $100_2$ according to the second embodiment will be described with reference to FIG. 7. The sensor $100_2$ is mainly different from a sensor $100_1$ in that it includes two PLL circuits (referred to as a first PLL circuit $120_1$ and a second PLL circuit $120_2$, respectively).

Each of the PLL circuits $120_1$ and $120_2$ generates one or more clock signals based on an external reference clock signal. For example, the PLL circuit $120_1$ supplies the clock signal to a timing generator 119 and, in addition to receiving a predetermined clock signal from the timing generator 119, generates the clock signal to be supplied to each unit of an output unit $U_{OUT}$. The PLL circuit $120_2$ generates the clock signal having a higher frequency than the clock signal generated by the PLL circuit $120_1$ and generates, for example, the clock signal to be supplied to a counter 110. Note that in this example, a case will be considered in which while the PLL circuit $120_2$ operates upon receiving power from a bandgap circuit 121, the PLL circuit $120_1$ operates upon receiving power not from the bandgap circuit 121 but from another power supply unit.

When the two different clock signals are respectively supplied to the two units having different timings at which power supply is stopped or resumed as in this example, timings at which power supply to the two PLL circuits $120_1$ and $120_2$ is stopped or resumed may be changed. This will be described below with reference to FIG. 5 (or FIG. 6) exemplified in the first embodiment.

In this example, a group G1 can include, for example, an image sensing unit 101, a comparator 106, a ramp generator 108, a counter 110, and a signal processing circuit 116 (as in the first embodiment). A group G2 can include, for example, the PLL circuit $120_2$ which supplies the clock signal to the counter 110. A group G3 can include, for example, an LVDS circuit 118 which receives the clock signal from the PLL circuit $120_1$. A group G4 can include, for example, the bandgap circuit 121 and the PLL circuit $120_1$.

According to the groups G1 to G4 in this example, the PLL circuit $120_2$ supplies the clock signal to the counter 110. Therefore, power supply to the PLL circuit $120_2$ is stopped after the power supply to the counter 110 and is resumed before the power supply to the counter 110.

The LVDS circuit 118 receives data corresponding to a signal from a readout unit $U_{RO}$. Therefore, power supply to the LVDS circuit 118 is stopped after the power supply to the readout unit $U_{RO}$ and is resumed before the power supply to the readout unit $U_{RO}$.

The PLL circuit $120_1$ supplies the clock signal to the LVDS circuit 118. Therefore, power supply to the PLL circuit $120_1$ is stopped after the power supply to the LVDS circuit 118 and is resumed before the power supply to the LVDS circuit 118.

Note that in this arrangement, the LVDS circuit 118 may be assigned to the group G2 and the PLL circuit $120_2$ may be assigned to the group G3.

In this example, the PLL circuit $120_1$ operates upon receiving not a voltage from the bandgap circuit 121 but another voltage. Therefore, in this example, power supply to the bandgap circuit 121 and the PLL circuit $120_1$ may be controlled almost simultaneously, and the bandgap circuit 121 and the PLL circuit $120_1$ are assigned to the same group G4.

(Third Embodiment)

Figure 8:
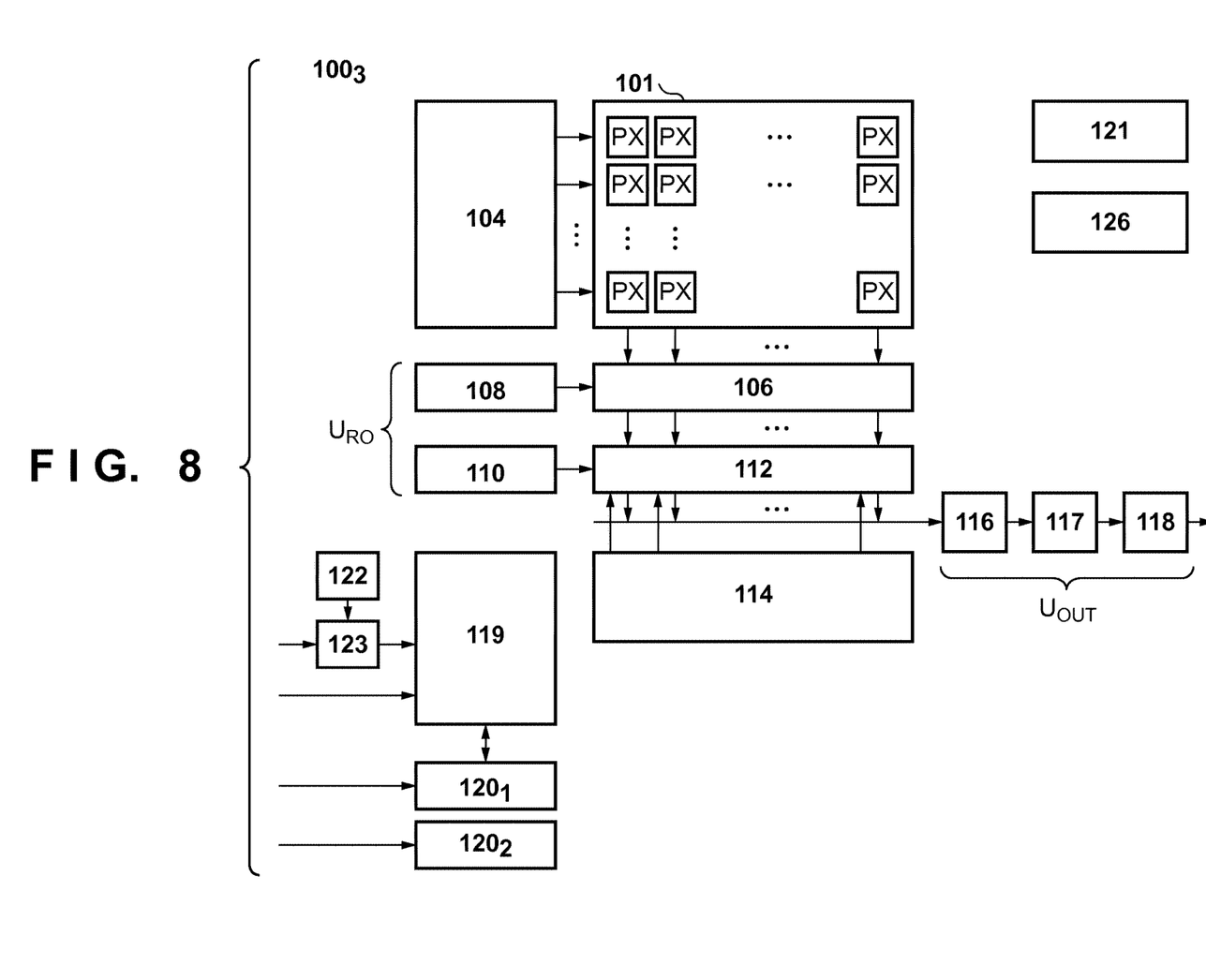
FIG. 8 is a block diagram for explaining an example of the overall arrangement of a solid-state image sensor.

A solid-state image sensor $100_3$ according to the third embodiment will be described with reference to FIG. 8. The sensor $100_3$ is mainly different from a sensor $100_2$ in that it further includes, in addition to a bandgap circuit 121, a negative voltage generating circuit 126. The negative voltage generating circuit 126 generates a negative voltage (a voltage lower than 0 [V]). This makes it possible to, for example, set L of a control signal TX supplied to a transfer transistor $T_{TX}$ of each pixel PX in an image sensing unit 101 to the negative voltage.

When two different power distributions are respectively supplied to two different units as in this example, timings to stop or resume supplying the two power distributions may be changed. This will be described below with reference to FIG. 5 (or FIG. 6) exemplified in the first embodiment.

In this example, a group G1 can include, for example, the image sensing unit 101, a comparator 106, a ramp generator 108, a counter 110, and a signal processing circuit 116 (as in the first and second embodiments). A group G2 can include, for example, a PLL circuit $120_2$ which supplies a clock signal to the counter 110 and an LVDS circuit 118 which receives a clock signal from a PLL circuit $120_1$. A group G3 can include, for example, the bandgap circuit 121 and the PLL circuit $120_1$. A group G4 can include, for example, the negative voltage generating circuit 126.

Power supply to the negative voltage generating circuit 126 is stopped after the power supply to the image sensing unit 101 and is resumed before the power supply to the counter 110. The timing at which power supply to the negative voltage generating circuit 126 is stopped need not be the last. However, when returning from a power saving mode to an active mode, the negative voltage generating circuit 126 requires a relatively long time to sufficiently charge an internally provided capacitance. It is therefore preferable to resume power supply to the negative voltage generating circuit 126 first.

Fourth Embodiment

The fourth embodiment will be described with reference to FIG. 9. In the aforementioned first embodiment, a mode in which the operating mode shifts to the power saving mode and then returns to the active mode while performing charge accumulation in the photoelectric conversion elements PD has been exemplified. However, a change in the operating mode is not limited the above-described mode. The operating mode may be changed, for example, after reading out one pixel signal (a pixel signal for one frame) from each of a plurality of pixels PX. More specifically, the operating mode may shift to the power saving mode in a period (a so-called vertical blanking period) from the end of reading out the pixel signal for one frame to the start of reading out a pixel signal for next one frame.

Figure 9:
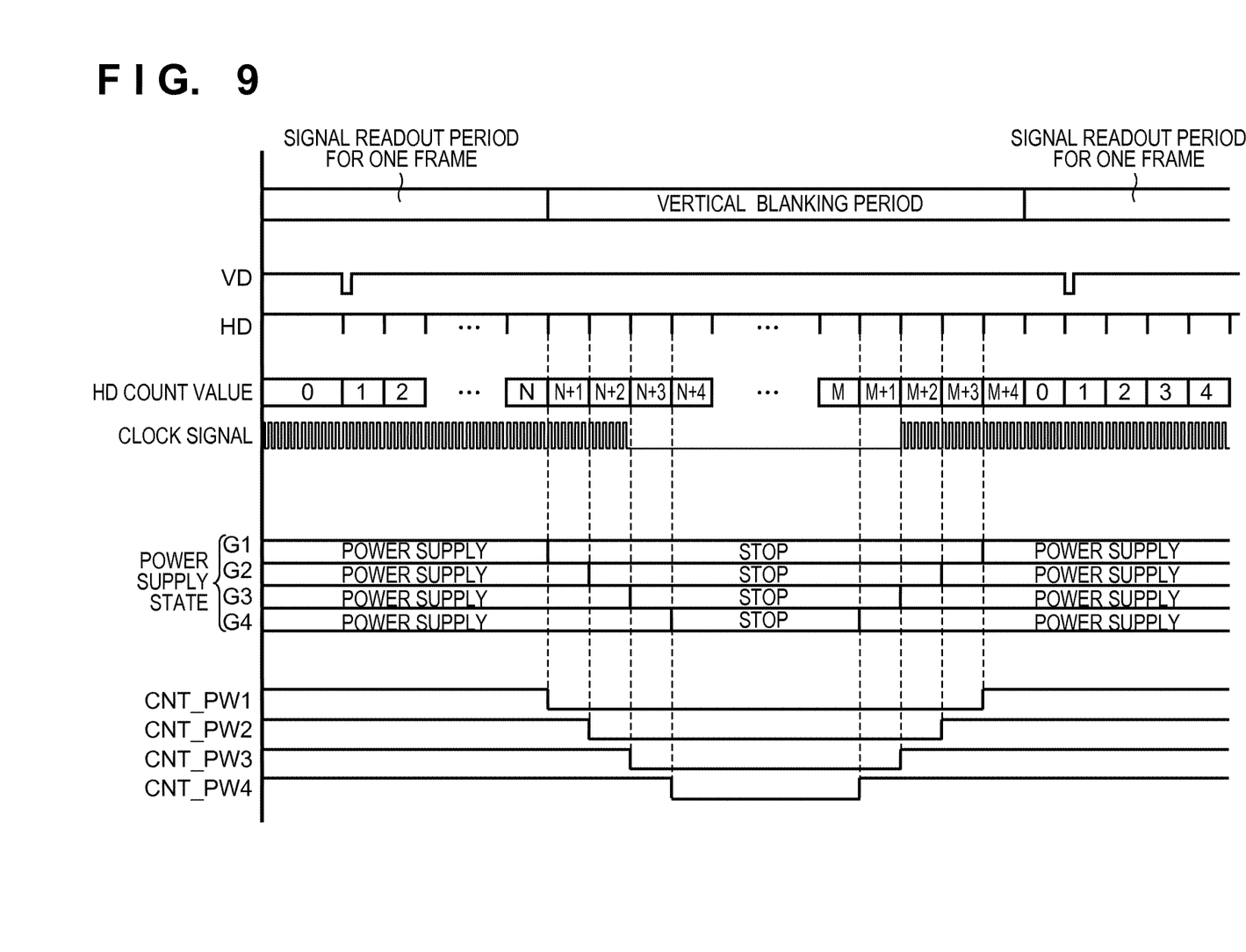
FIG. 9 is a timing chart showing an example when changing an operating mode.

FIG. 9 shows a timing chart according to this embodiment as in FIGS. 5 to 6 (first embodiment). For example, a horizontal synchronizing signal HD of N pulses is received (N columns are selected sequentially) while receiving a vertical synchronizing signal VD of one pulse (while selecting one row). Then, in this example, the pulses of the horizontal synchronizing signal HD are counted by using the second counter and based on that result, power supply to each group G is stopped or the power supply is resumed.

More specifically, an HD count value is counted up every pulse of the horizontal synchronizing signal HD. When shifting from the active mode to the power saving mode, power supply to a group G1 is stopped when, for example, the HD count value becomes larger than "N" (in this example, when the HD count value becomes "N+1"). Then, power supply to a group G2 is stopped when the HD count value is counted up (in this example, when the HD count value becomes "N+2") in accordance with the next horizontal synchronizing signal HD. Similarly, power supply to groups G3 and G4 is stopped when the HD count value becomes "N+3" and "N+4", respectively.

The same also applies when returning from the power saving mode to the active mode. More specifically, power supply to the group G4 is resumed when the HD count value becomes larger than "M (>N)" (in this example, when the HD count value becomes "M+1"). Then, power supply to the group G3 is resumed when the HD count value is counted up (in this example, when the HD count value becomes "M+2") in accordance with the next horizontal synchronizing signal HD. Similarly, power supply to the groups G2 and G1 is resumed when the HD count value becomes "M+3" and "M+4", respectively.

After that, the HD count value is reset and the readout of the pixel signal for the next one frame is started.

The several preferred embodiments have been exemplified above. However, the present invention is not limited to these embodiments. The present invention may change some of the embodiments or combine the respective characteristics of the respective embodiments in accordance with an application or the like. Further, the arrangement of each unit can be changed in accordance with the application or the like. For example, each function of two or more units may be achieved by one unit or some functions of a certain unit may be achieved by another unit.

(Arrangement Example of Camera)

Figure 10:
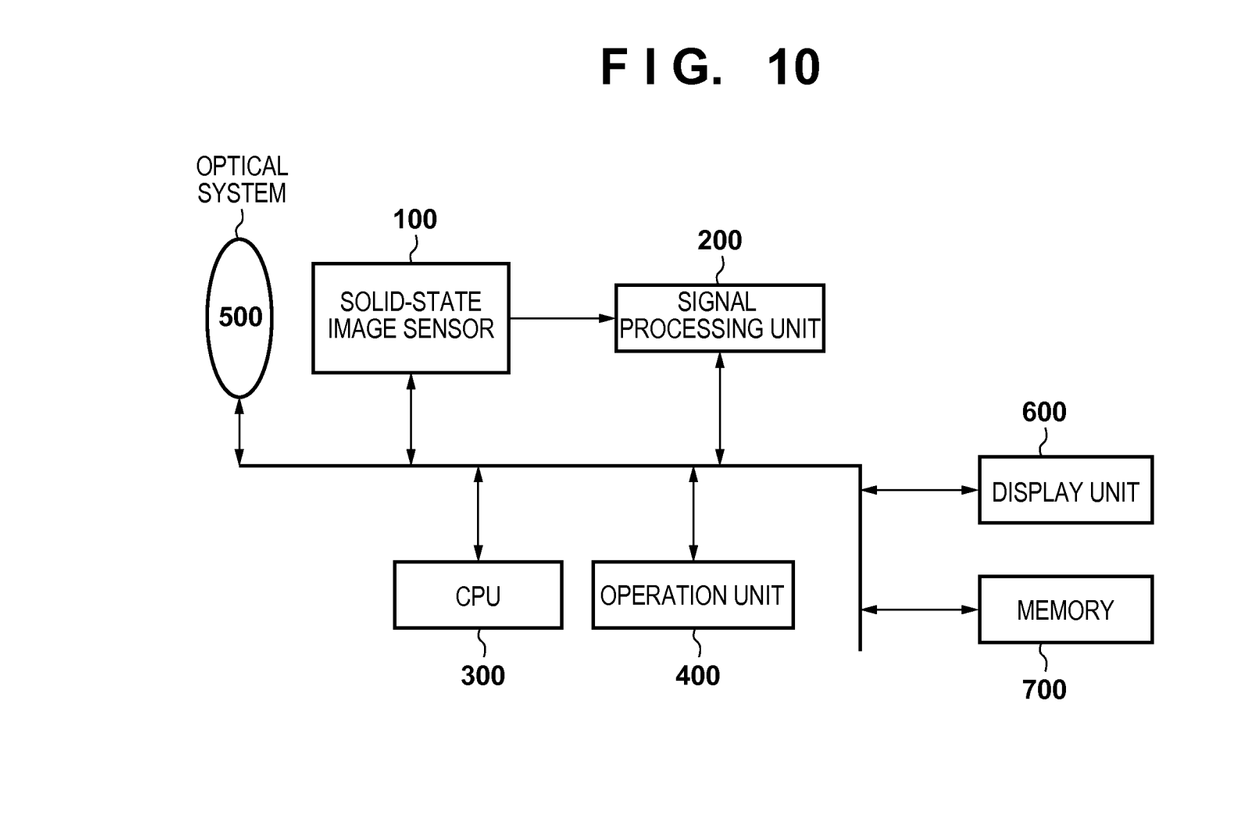
FIG. 10 is a block diagram for explaining an arrangement example of a camera.

FIG. 10 is a diagram for explaining an arrangement example of a camera to which a solid-state image sensor 100 exemplified in each embodiment is applied. In addition to the solid-state image sensor 100, the camera includes, for example, a signal processing unit 200, a CPU 300 (or a processor), an operation unit 400, and an optical system 500 configured to form an object image in the image sensing unit. The camera can further include a display unit 600 configured to display a still image or a moving image to a user and a memory 700 configured to store data thereof.

The solid-state image sensor 100 obtains image data based on incident light from the optical system 500. The image data undergoes predetermined correction processing by the signal processing unit 200, and is also output to the display unit 600 and the memory 700. Further, in accordance with shooting conditions input by the user via the operation unit 400, the CPU 300 can change setting information or the control method of each unit.

Note that the concept of the camera includes not only an apparatus mainly aiming at shooting but also an apparatus (for example, a personal computer or a portable terminal) accessorily having a shooting function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211088, filed Oct. 15, 2014, which is hereby incorporated by reference herein in its entirety.

What is claimed is:

1. A solid-state image sensor including a plurality of pixels arrayed so as to form a plurality of rows and a plurality of columns, the sensor comprising:
a driving unit configured to drive, based on a first synchronizing signal, the plurality of pixels while scanning the pixels for each row;
a readout unit configured to read out pixel signals from the plurality of pixels driven by the driving unit;
a transferring unit configured to transfer, based on a second synchronizing signal, the pixel signals read out by the readout unit while scanning the pixel signals for each column;
an output unit configured to output the pixel signals transferred by the transferring unit;
a power supply unit configured to supply power to the readout unit and the output unit; and
a control unit,
wherein the control unit:
increases, in a first case in which a readout of the pixel signals is started, a power supply amount to at least one of the readout unit and the output unit by the power supply unit at a timing when a first period based on at least one of the first synchronizing signal and the second synchronizing signal has elapsed after setting the power supply unit from a non-operating state to an operating state, and
sets, in a second case in which the readout of the pixel signals is completed, the power supply unit from the operating state to the non-operating state at a timing when a second period based on at least one of the first synchronizing signal and the second synchronizing signal has elapsed after decreasing the power supply amount to the at least one of the readout unit and the output unit by the power supply unit.

2. The sensor according to claim 1, wherein both the first period and the second period are integer multiples of a cycle of at least one of the first synchronizing signal and the second synchronizing signal.

3. The sensor according to claim 1, wherein the control unit:
increases, in the first case, the power supply amount to the readout unit by the power supply unit at a timing when a period based on at least one of the first synchronizing signal and the second synchronizing signal has elapsed after increasing the power supply amount to the output unit by the power supply unit, and decreases, in the second case, the power supply amount to the output unit by the power supply unit at the timing when the period based on at least one of the first synchronizing signal and the second synchronizing signal has elapsed after decreasing the power supply amount to the readout unit by the power supply unit.

4. The sensor according to claim 3, further comprising a first signal generating unit configured to generate a control signal for controlling the output unit,
wherein the control unit:
starts, in the first case, supplying the control signal to the output unit by the first signal generating unit at the timing when the period based on at least one of the first synchronizing signal and the second synchronizing signal has elapsed after increasing the power supply amount to the output unit by the power supply unit, and
decreases, in the second case, the power supply amount to the output unit by the power supply unit at the timing when the period based on at least one of the first synchronizing signal and the second synchronizing signal has elapsed after stopping supplying the control signal to the output unit by the first signal generating unit.

5. The sensor according to claim 4, further comprising a second signal generating unit configured to generate a control signal for controlling the readout unit,
wherein the control unit:
starts, in the first case, supplying the control signal to the readout unit by the second signal generating unit at the timing when the period based on at least one of the first synchronizing signal and the second synchronizing signal has elapsed after increasing the power supply amount to the readout unit by the power supply unit, and
decreases, in the second case, the power supply amount to the readout unit by the power supply unit at the timing when the period based on at least one of the first synchronizing signal and the second synchronizing signal has elapsed after stopping supplying the control signal to the readout unit by the second signal generating unit.

6. The sensor according to claim 5, wherein the control unit:
starts, in the first case, supplying the control signal to the readout unit by the second signal generating unit at the timing when the period based on at least one of the first synchronizing signal and the second synchronizing signal has elapsed after starting supplying the control signal to the output unit by the first signal generating unit, and
stops, in the second case, supplying the control signal to the output unit by the first signal generating unit at the timing when the period based on at least one of the first synchronizing signal and the second synchronizing signal has elapsed after stopping supplying the control signal to the readout unit by the second signal generating unit.

7. The sensor according to claim 6, wherein the power supply unit includes a bandgap circuit,
the first signal generating unit includes a first PLL circuit, the second signal generating unit includes a second PLL circuit different from the first PLL circuit,
the readout unit includes a comparator, a ramp generator, and a counter, and
the output unit includes an LVDS circuit.

8. The sensor according to claim 1, further comprising a storage unit configured to store information which specifies the first period and the second period,
wherein both the first period and the second period are based on the information stored in the storage unit.

9. The sensor according to claim 8, wherein the information in the storage unit is set based on an exposure condition for the sensor.

10. The sensor according to claim 1, wherein the power supply unit is connected to a power supply line via a first switch, and at least one of the readout unit and the output unit is connected to the power supply unit via a second switch,
the control unit includes a latch circuit, and
the control unit:
outputs, in the first case, after outputting, in response to a notification that the readout of the pixel signals is started, a signal for turning on the first switch while latching a signal according to the notification by the latch circuit, the latched signal being a signal for turning on the second switch after the first period has elapsed, and
outputs, in the second case, after outputting, in response to a notification that the readout of the pixel signals is completed, a signal for turning off the second switch while latching a signal according to the notification by the latch circuit, the latched signal being a signal for turning off the first switch after the second period has elapsed.

11. A camera comprising:
a solid-state image sensor including a plurality of pixels arrayed so as to form a plurality of rows and a plurality of columns; and
a processor configured to process a signal from the solid-state image sensor,
wherein the solid-state image sensor includes:
a driving unit configured to drive, based on a first synchronizing signal, the plurality of pixels while scanning the pixels for each row,
a readout unit configured to read out pixel signals from the plurality of pixels driven by the driving unit,
a transferring unit configured to transfer, based on a second synchronizing signal, the pixel signals read out by the readout unit while scanning the pixel signals for each column,
an output unit configured to output the pixel signals transferred by the transferring unit,
a power supply unit configured to supply power to the readout unit and the output unit, and
a control unit, and
the control unit:
increases, in a first case in which a readout of the pixel signals is started, a power supply amount to at least one of the readout unit and the output unit by the power supply unit at a timing when a first period based on at least one of the first synchronizing signal and the second synchronizing signal has elapsed after setting the power supply unit from a non-operating state to an operating state, and
sets, in a second case in which the readout of the pixel signals is completed, the power supply unit from the operating state to the non-operating state at a timing when a second period based on at least one of the first synchronizing signal and the second synchronizing signal has elapsed after decreasing the power supply amount to the at least one of the readout unit and the output unit by the power supply unit.

* * * * *